(12) United States Patent
Mackenzie et al.

(10) Patent No.: US 10,728,843 B2
(45) Date of Patent: Jul. 28, 2020

(54) CELLULAR TELECOMMUNICATIONS NETWORK

(71) Applicant: British Telecommunications Public Limited Company, London (GB)

(72) Inventors: Richard Mackenzie, London (GB); Michael Fitch, London (GB)

(73) Assignee: British Telecommunications Public Limited Company, London (GB)

( * ) Notice: Subject to any disclaimer, the term of this patent is extended or adjusted under 35 U.S.C. 154(b) by 0 days.

(21) Appl. No.: 16/335,708

(22) PCT Filed: Aug. 29, 2017

(86) PCT No.: PCT/EP2017/071645
§ 371 (c)(1),
(2) Date: Mar. 22, 2019

(87) PCT Pub. No.: WO2018/059858
PCT Pub. Date: Apr. 5, 2018

(65) Prior Publication Data
US 2019/0313329 A1    Oct. 10, 2019

(30) Foreign Application Priority Data

Sep. 29, 2016   (EP) .................................... 16191524

(51) Int. Cl.
*H04W 52/02*    (2009.01)
*H04W 72/04*    (2009.01)

(52) U.S. Cl.
CPC ... *H04W 52/0206* (2013.01); *H04W 72/0426* (2013.01); *Y02D 70/00* (2018.01);
(Continued)

(58) Field of Classification Search
CPC .......... H04W 52/0206; H04W 72/0426; Y02D 70/23; Y02D 70/142; Y02D 70/1262; Y02D 70/00; Y02D 70/164
See application file for complete search history.

(56) References Cited

U.S. PATENT DOCUMENTS 8,903,402 B2    12/2014 Guo et al.
9,215,629 B2    12/2015 Hapsari et al.
(Continued)

FOREIGN PATENT DOCUMENTS

CN    105611554 A    5/2016
EP    2154917 A1    2/2010
(Continued)

OTHER PUBLICATIONS

3GPP 36.420 v8.0.0 (Dec. 2007), "X2 General Aspects and Principals," Technical Specification, 3rd Generation Partnership Project, http://www.qtc.jp/3GPP/Specs/36420-800.pdf, (Release 8), Dec. 2007, 11 pages.

(Continued)

*Primary Examiner* — Hashim S Bhatti
(74) *Attorney, Agent, or Firm* — Patterson Thuente Pedersen, P.A.

(57) ABSTRACT

This disclosure provides a base station, and a method of operating a base station, in a cellular telecommunications network, the base station having normal, compensation and energy saving modes of operation.

6 Claims, 12 Drawing Sheets

(52) U.S. Cl.
CPC ........ *Y02D 70/1262* (2018.01); *Y02D 70/142* (2018.01); *Y02D 70/164* (2018.01); *Y02D 70/23* (2018.01)

(56) References Cited

U.S. PATENT DOCUMENTS

| | | | |
|---|---|---|---|
| 9,301,105 | B2 | 3/2016 | Kim et al. |
| 9,392,420 | B2 | 7/2016 | Fodor et al. |
| 9,439,137 | B2 | 9/2016 | Kim et al. |
| 10,405,280 | B2 | 9/2019 | Mackenzie et al. |
| 2010/0120447 | A1 | 5/2010 | Anderson et al. |
| 2010/0157911 | A1 | 6/2010 | Hegde et al. |
| 2010/0178912 | A1 | 7/2010 | Gunnarsson et al. |
| 2011/0190027 | A1 | 8/2011 | Michel et al. |
| 2011/0274030 | A1 | 11/2011 | Wang et al. |
| 2012/0002537 | A1 | 1/2012 | Bao et al. |
| 2012/0026865 | A1 | 2/2012 | Fan et al. |
| 2012/0157095 | A1 | 6/2012 | Fodor et al. |
| 2012/0236828 | A1 | 9/2012 | Hapsari et al. |
| 2012/0257495 | A1 | 10/2012 | Schwarz et al. |
| 2012/0264418 | A1 | 10/2012 | Lee et al. |
| 2012/0275315 | A1 | 11/2012 | Schlangen et al. |
| 2013/0005340 | A1 | 1/2013 | Drazynski et al. |
| 2013/0035033 | A1 | 2/2013 | Sanneck et al. |
| 2013/0084873 | A1 | 4/2013 | Sharony et al. |
| 2013/0150044 | A1 | 6/2013 | Zhang et al. |
| 2013/0170435 | A1 | 7/2013 | Dinan |
| 2013/0242720 | A1 | 9/2013 | Chou |
| 2013/0260768 | A1 | 10/2013 | Guo et al. |
| 2014/0018057 | A1* | 1/2014 | Yu .............. H04W 52/0206 455/418 |
| 2014/0038593 | A1 | 2/2014 | Kim et al. |
| 2014/0050135 | A1 | 2/2014 | Zhang |
| 2014/0071891 | A1 | 3/2014 | Zhou et al. |
| 2014/0092765 | A1 | 4/2014 | Agarwal et al. |
| 2014/0187236 | A1 | 7/2014 | Chiang et al. |
| 2014/0269547 | A1 | 9/2014 | Valliappan et al. |
| 2014/0286218 | A1 | 9/2014 | Park |
| 2015/0063136 | A1 | 3/2015 | Shen et al. |
| 2015/0092552 | A1 | 4/2015 | Bajj et al. |
| 2015/0131524 | A1 | 5/2015 | Cavalcante et al. |
| 2015/0271714 | A1 | 9/2015 | Shetigar et al. |
| 2015/0312769 | A1 | 10/2015 | Shindo |
| 2015/0358940 | A1 | 12/2015 | Zhang et al. |
| 2016/0057699 | A1 | 2/2016 | Jang |
| 2016/0088493 | A1 | 3/2016 | Byun et al. |
| 2016/0150420 | A1* | 5/2016 | Byun .............. H04W 4/06 370/312 |
| 2016/0192177 | A1 | 6/2016 | Kim et al. |
| 2017/0055186 | A1 | 2/2017 | Donepudi et al. |
| 2017/0086181 | A1 | 3/2017 | Briggs |
| 2017/0303188 | A1 | 10/2017 | Fitch et al. |
| 2017/0318526 | A1* | 11/2017 | Wang .............. H04W 52/0206 |
| 2018/0054840 | A1 | 2/2018 | Fitch et al. |
| 2018/0262922 | A1 | 9/2018 | Mackenzie et al. |

FOREIGN PATENT DOCUMENTS

| | | |
|---|---|---|
| EP | 2271142 A1 | 1/2011 |
| EP | 2 663 131 A1 | 11/2013 |
| EP | 2814279 A1 | 12/2014 |
| EP | 2 916 584 A1 | 9/2015 |
| EP | 2 928 225 A1 | 10/2015 |
| EP | 2 975 886 A1 | 1/2016 |
| EP | 3 065 438 A1 | 9/2016 |
| WO | WO-2009022976 A1 | 2/2009 |
| WO | WO-2010024743 A1 | 3/2010 |
| WO | WO-2011028158 A1 | 3/2011 |
| WO | WO-2011056023 A2 | 5/2011 |
| WO | WO-2012138125 A2 | 10/2012 |
| WO | WO 2012/148442 A1 | 11/2012 |
| WO | WO-2013071813 A1 | 5/2013 |
| WO | WO-2013120274 A1 | 8/2013 |
| WO | WO-2013142361 A1 | 9/2013 |
| WO | WO 2014/161896 A1 | 10/2014 |
| WO | WO 2015/019317 A1 | 2/2015 |
| WO | WO-2015034775 A1 | 3/2015 |
| WO | WO 2015/062060 A1 | 5/2015 |
| WO | WO-2016079016 A1 | 5/2016 |
| WO | WO-2016146328 A1 | 9/2016 |
| WO | WO-2017148752 A1 | 9/2017 |
| WO | WO-2018059859 A1 | 4/2018 |
| WO | WO-2018059860 A1 | 4/2018 |
| WO | WO2019015900 A1 | 1/2019 |

OTHER PUBLICATIONS

3rd Generation Partnership Project, Technical Specification Group Radio Access Network, Evolved Universal Terrestrial Radio Access (E-UTRA), Radio Frequency (RF) system scenarios (Release 9) 3GPP TR 36.942 V9.3.0, Jun. 2012, 83 pages.

3rd Generation Partnership Project, Technical Specification Group Services and System Aspects, Telecommunication Management, "Study on Management of Evolved Universal Terrestrial Radio Access Network (E-UTRAN) and Evolved Packet Core (EPC)," Release 8 3GPP TR 32.816 V8.0.0, Technical Report, Valbonne— France, Dec. 2008, 38 pages.

Carlson et al., "Scheduling to Minimize Interaction Cost," The Johns Hopkins University, Baltimore, Maryland, Jun. 2, 1965, 8 pages.

Codan Radio, "RF Link Controlled Base Station," Codan Radio Communications, retrieved from https://www.codanradio.com/product/rf-link-controlled-base/, Accessed on Aug. 8, 2017, 2 pages.

European Search Report for EP Application No. 16158665.6 dated Sep. 13, 2016, 6 pages.

European Search Report for EP Application No. 16160809.6 dated Sep. 26, 2016, 14 pages.

European Search Report for EP Application No. 17180358.8, dated Jan. 31, 2018, 5 pages.

Extended European Search Report for Application No. 15187067.2, dated Mar. 18, 2016, 8 pages.

Extended European Search Report for Application No. EP14194204.5, dated Jul. 23, 2015, 7 pages.

Extended European Search Report for Application No. EP15275077.4, dated Sep. 4, 2015, 8 pages.

Fairbrother et al., "A Two-Level Graph Partitioning Problem Arising in Mobile Wireless Communications"; arXiv: 1705.08773v1 [math.OC] May 24, 2017; 23 pages.

GB Search Report for Application No. 1517069.9, dated Mar. 7, 2016, 4 pages.

GB Combined Search and Examination Report for Application No. 1517069.9, dated Jan. 31, 2018, 3 pages.

GB Combined Search and Examination Report for GB Application No. GB1603748.3, dated Aug. 26, 2016, 6 pages.

GB Search and Examination Report for GB Application No. GB 1710989.3, dated Dec. 1, 2017, 5 pages.

Ghaddar et al., "A Branch-And-Cut Algorithm Based on Semidefinite Programming for the Minimum K-Partition Problem," Ann Oper Res DOI 10 1007/s10479-008-0481-4, Springer Science+Business Media, LLC 2008, Published online Dec. 3, 2008, 20 pages.

International Preliminary Report on Patentability for Application No. PCT/EP2015/076524, dated Mar. 7, 2017, 12 pages.

International Preliminary Report on Patentability for Application No. PCT/EP2016/053286, dated Feb. 6, 2017, 14 pages.

International Preliminary Report on Patentability for Application No. PCT/EP2016/069745, dated Oct. 20, 2017, 13 pages.

International Preliminary Report on Patentability for Application No. PCT/EP2017/052738, dated Jun. 22, 2018, 27 pages.

International Preliminary Report on Patentability for Application No. PCT/EP2017/071646, dated Apr. 11, 2019, 8 pages.

International Preliminary Report on Patentability for Application No. PCT/EP2017/071649, dated Apr. 11, 2019, 8 pages.

International Preliminary Report on Patentability for PCT Application No. PCT/EP2017/053957, dated Sep. 4, 2018, 6 pages.

International Search Report and Written Opinion for Application No. PCT/EP2015/076524, dated Dec. 21, 2015, 11 pages.

International Search Report and Written Opinion for Application No. PCT/EP2016/053286, dated Apr. 11, 2016, 11 pages.

(56) References Cited

OTHER PUBLICATIONS

International Search Report and Written Opinion for Application No. PCT/EP2016/069745, dated Nov. 11, 2016, 11 pages.
International Search Report and Written Opinion for PCT Application No. PCT/EP2017/052738, dated Mar. 27, 2017, 20 pages.
International Search Report and Written Opinion for PCT Application No. PCT/EP2017/053957, dated May 23, 2017, 11 pages.
Macqueen J., "Some Methods for Classification and Analysis of Multivariate Observations," Fifth Berkeley Symposium, University of California, Los Angeles, 1967, pp. 281-297.
Motorola, et al., "Draft CR capturing HeNB inbound mobility agreements," 3GPP Draft, R2-096401 CR HENB 36_300 Agreements_V7, 3rd Generation Partnership Project (3GPP), Jeju, Korea, XP050391033, Nov. 9, 2009, 4 pages.
Mukhopadhyay et al., "Novel RSSI Evaluation Models for Accurate Indoor Localization With Sensor Networks," 978-1-4799-2361-8/14, Bharti School of Telecommunication Technology and Management IIT Delhi Hauz Khas, New Delhi, 2014 IEEE, 6 pages.
NGNM the engine of broadband wireless innovation "Recommended Practices for multi-vendor SON deployment," Deliverable D2 Version 1.0 by NGNM Alliance, Reading Bridge House George Street Reading Berkshire RG 1 8LS UK, Jan. 28, 2014, 30 pages.
Ning L., et al., "Fuzzy Layered Physical Cell Identities Assignment in Heterogeneous and Small Cell Networks," Electronics Letters May 12, 2016, vol. 52 No. 10, pp. 879-881.
Qualcomm Technologies, Inc. "LTE Small Cell SON Test Cases, Functionality and Interworking", San Diego, CA, USA, Jun. 5, 2015, 82 pages.
Qualcomm Europe, "QoS principles for CSG members and non-members at hybrid access mode HeNBs," 3GPP Draft, R3-091022, 3rd Generation Partnership Project (3GPP), San Francisco, US, XP050341407, May 4-8, 2009, 4 pages.
Qualcomm Europe, "QoS support for hybrid CSG cells," 3GPP Draft, R3-091454, 3rd Generation Partnership Project (3GPP), San Francisco, US, XP050341776, May 4, 2009, 3 pages.
Rendl F., "Semidefinite Relaxations for Partitioning, Assignment and Ordering Problems," Cross Mark, Ann Oper Res (2016) 240 119-140 DOI 10 1007/s10479-015-2015-1, Published online Sep. 15, 2015, Springer Science+Business Media New York 2015, 22 pages.
Small Cell Forum Release 9.0, Document 176.09.01 LTE small cell SON test cases, Functionality and interworking, version 176.09.01, Feb. 21, 2017, 95 pages.
UK Combined Search and Examination Report for GB Patent Application No. GB1604515.5, dated Sep. 9, 2016, 3 pages.
UK Examination Report for GB Patent Application No. GB1604515.5, dated May 11, 2017, 1 pages.
UK Examination Report for GB Patent Application No. GB1604515.5, dated Jan. 31, 2018, 3 pages.
UK Intention to Grant for GB Patent Application No. GB1604515.5, dated May 11, 2018, 2 pages.
Web article, "DSDP," NEOS Interfaces to DSDP, http://www.mcs.anl.gov/DSDP, retrieved Jul. 3, 2017, 4 pages.
Web article, "Welcome to CVXPY," Welcome to CVXPY—CVXPY 0.4.9 documentation, http://www.cvxpy.org/en/latest, retrieved Jul. 3, 2017, 1 page.
Wu et al., "Physical Cell Identity Self-Organization for Home eNodeB Deployment in LTE"; Nokia Siemens Networks, 978-1-4244-3709-2/10, Beijing China, 2010 IEEE, 6 pages.
Younis., et al., "Military Communications; Cognitive MANET Design for Mission-Critical Networks," IEEE Communications Magazine, 0163-6804/09 2009 IEEE, Oct. 2009, 5 pages.
U.S. Appl. No. 16/335,802, filed Mar. 22, 2019, Inventor(s): Mackenzie et al.
U.S. Appl. No. 16/335,863, filed Mar. 22, 2019, Inventor(s): Mackenzie et al.
Application and Filing Receipt for U.S. Appl. No. 16/082,870, filed Feb. 8, 2017, Inventor(s): MacKenzie et al.
European Search Report, Application No. 19194981.7, dated Nov. 27, 2019, 8 pages.
International Search Report and Written Opinion for corresponding PCT Application No. PCT/EP2017/071645 dated Nov. 27, 2017; 18 pages.
3GPP TS 36.300 V11 6.0 (Jun. 2013); $3^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11); 650 Route des Luciales—Sophia Antipolis Valbonne—France; 209 pages.
3GPP TS 32.551 V15.0.0 (Jun. 2018); $3^{rd}$ Generation Partnership Project; Technical Specification Group Services and System Aspects; Telecommunication management; Energy Saving Management (ESM); Concepts and requirements (Release 15); 650 Route des Luciales—Sophia Antipolis Valbonne—France; 26 pages.
3GPP TR 36.927 V15.0.0 (Jul. 2018); $3^{rd}$ Generation Partnership Project; Technical Specification Group Radio Access Network; Evolved Universal Terrestrial Radio Access (E-UTRA); Potential solution for energy saving for E-UTRAN (Release 15); 650 Route des Luciales—Sophia Antipolis Valbonne—France; 22 pages.
3GPP TS 36.300 V13.3.0 (Mar. 2016); $3^{rd}$ Generation Partnership Project; Technical Specification Group Radio Access Network; Evolved Universal Terrestrial Radio Access (E-UTRA) and Evolved Universal Terrestrial Radio Access Network (E-UTRAN) Overall description; Stage 2 (Release 13); 650 Route des Luciales—Sophia Antipolis Valbonne—France; 295 pages.
ETSI TS 132 551 V13.0.0 (Feb. 2016); Technical Specification Universal Mobile Telecommunications System (UMTS); LTE; Telecommunication management; Energy Saving Management (ESM); Concepts and requirement (3GPP TS 32.551 version 13.0.0 Release 13); 650 Route des Luciales—Sophia Antipolis Valbonne—France; 28 pages.
3GPP TR 24.826 V11.0.0 (Jun. 2011); $3^{rd}$ Generation Partnership Project; Technical Specification Group Core Network and Terminals; Study on impacts on signaling between User Equipment (UE) and core network from energy saving (Release 11); 650 Route des Luciales—Sophia Antipolis Valbonne—France; 33 pages.
ETSI TR 136 927 V13.0.0 (Jan. 2016); Technical Report LTE; Evolved Universal Terrestrial Radio Access (E-UTRA); Potential solutions for energy saving for E-UTRAN (3GPP TR 36.927 version 13.0.0 Release 13); 650 Route des Luciales—Sophia Antipolis Valbonne—France; 26 pages.
GB Intention to Grant for GB Application No. GB1713816.5, dated Jan. 14, 2019, 2 pages.
GB Examination Report for GB Application No. GB1713816.5, dated Nov. 15, 2018, 3 pages.
GB Examination Report for GB Application No. GB1713816.5, dated Oct. 10, 2017, 3 pages.
GB Examination Report for GB Application No. GB1713816.5, dated Sep. 20, 2017, 5 pages.
GB Intention to Grant for GB Application No. GB1713815.7, dated Jan. 14, 2019, 2 pages.
GB Examination Report for GB Application No. GB1713815.7, dated Nov. 15, 2018, 3 pages.
GB Combined Search and Examination Report for GB Application No. GB1713815.7, dated Sep. 21, 2017, 5 pages.
Invitation to pay additional fees and, where applicable, protest fees for PCT Application No. PCT/EP2017/071645; 17 pages.
GB Combined Search and Examination Report for GB Application No. GB1616530.0, dated Feb. 23, 2017, 6 pages.
European Search Report for EP Application No. 16191519.4, dated Mar. 31, 2017, 8 pages.
GB Combined Search and Examination Report for GB Application No. GB1616539.1 dated Mar. 2, 2017, 6 pages.
European Search Report for EP Application No. 16191517.8, dated Mar. 27, 2017, 8 pages.
European Search Report for EP Application No. 16191524.4, dated Apr. 7, 2017, 10 pages.
International Search Report and Written Opinion for PCT Application No. PCT/EP2017/071646 dated Oct. 18, 2017, 12 pages.
GB Combined Search and Examination Report for GB Application No. GB1616534.2, dated Mar. 1, 2017, 8 pages.

(56) References Cited

OTHER PUBLICATIONS

International Search Report and Written Opinion for PCT Application No. PCT/EP2017/071649 dated Oct. 12, 2017, 9 pages.

* cited by examiner

| Base Station ID (eCGI) | Operational Mode | Compensator(s) (eCGI) | Connected UEs | Location | Max Power | EARFCN | Services | Neighbour List (eCGI) | Dormant Time | Configuration Changes |
|---|---|---|---|---|---|---|---|---|---|---|
| eNB 10 | Normal | N/A | 1 | N/A | N/A | N/A | N/A | N/A | N/A | N/A |
| Second eNB 20 | Compensation | N/A | 2 | N/A | N/A | N/A | ... | N/A | N/A | N/A |
| Third eNB 30 | Energy Saving Mode | Second eNB 20 | 0 | GNSS Coordinates | ... | ... | ... | eNB 10, second eNB 20, fourth eNB 40 | 22:00:00.000 13/01/2016 | N/A |
| Fourth eNB 40 | Normal | N/A | 1 | N/A | N/A | N/A | N/A | N/A | N/A | N/A |

Table illustrating data contained in the Neighbour Relations Table

Figure 5

| Base Station ID (eCGI) | Operational Mode | Compensator(s) (eCGI) | Connected UEs | Location | Max Power | EARFCN | Services | Neighbour List (eCGI) | Dormant Time | Configuration Changes |
|---|---|---|---|---|---|---|---|---|---|---|
| eNB 10 | Compensation | N/A | 2 | N/A | N/A | N/A | N/A | N/A | N/A | N/A |
| Second eNB 20 | Energy Saving Mode | eNB 10, fourth eNB 40 | 0 | GNSS Coordinates | ... | ... | ... | eNB 10, third eNB 30, fourth eNB 40 | 23:50:24.000 13/01/206 | N/A |
| Third eNB 30 | Energy Saving Mode | eNB 10, fourth eNB 40 | 0 | GNSS Coordinates | ... | ... | ... | eNB 10, second eNB 20, fourth eNB 40 | 22:00:00.000 13/01/2016 | Inherited from Second eNB 20 |
| Fourth eNB 40 | Compensation | N/A | 2 | N/A | N/A | N/A | N/A | N/A | N/A | Power Increased by 10dBm |

Table illustrating data contained in the Neighbour Relations Table

Figure 7

| Base Station ID (eCGI) | Operational Mode | Compensator(s) (eCGI) | Connected UEs | Location | Max Power | EARFCN | Services | Neighbour List (eCGI) | Dormant Time | Configuration Changes |
|---|---|---|---|---|---|---|---|---|---|---|
| eNB 10 | Normal | N/A | 1 | N/A | N/A | N/A | N/A | N/A | N/A | N/A |
| Second eNB 20 | Energy Saving Mode | Third eNB 30 | 0 | GNSS Coordinates | ... | ... | ... | eNB 10, third eNB 30, fourth eNB 40 | 23:50:24.000 13/01/206 | Inherited from eNB 10 |
| Third eNB 30 | Compensation | N/A | 2 | N/A | N/A | N/A | N/A | N/A | N/A | N/A |
| Fourth eNB 40 | Normal | N/A | 1 | N/A | N/A | N/A | N/A | N/A | N/A | N/A |

Table illustrating data contained in the Neighbour Relations Table

Figure 10

CELLULAR TELECOMMUNICATIONS NETWORK

CROSS-REFERENCE TO RELATED APPLICATION

The present application is a National Phase entry of PCT Application No. PCT/EP2017/071645, filed Aug. 29, 2017, which claims priority from EP Patent Application No. 16191524.4 filed Sep. 29, 2016 each of which is hereby fully incorporated herein by reference.

TECHNICAL FIELD

The present disclosure relates to a method of operating a base station in a cellular telecommunications network.

BACKGROUND

Cellular telecommunications networks include a network of base stations which communicate with User Equipment (UE) within a particular coverage area. Traditional base stations are often known as macrocells (owing to their relatively large coverage area over several kilometers squared), but modern cellular networks also include small cells (including femtocells, picocells, microcells and metrocells) which have smaller coverage areas than the macrocell. The use of these different technologies allows Network Operators to increase capacity by deploying the small cell base stations to a large number of customer premises (e.g. homes and businesses), thereby increasing capacity where there is demand.

Despite the advantages of a mass deployment of small cell base stations within a heterogeneous network, Network Operators are conscious of the increased energy demand of such a large number of base stations. Accordingly, the $3^{rd}$ Generation Partnership Project (3GPP) introduced an energy saving feature in Technical Specification (TS) 36.300, section 22.4.4. In this standard, base stations were designated as either "coverage" or "capacity". The coverage base station provides basic service about a large coverage area but also controlled one or more capacity base stations. The coverage base station may therefore switch the capacity base stations between normal and energy saving modes of operation according to an energy saving policy (such that the capacity base stations enter energy saving mode when demand is low). The capacity base stations were also allowed to autonomously switch between the normal and energy saving mode, but under a policy set by the coverage base station. The switch off instruction or the policy may also come from the Network Operator via the coverage base station. Nonetheless, each base station had one of two defined roles in which it could operate.

The energy saving function is further defined in 3GPP TS 32.551. This specification discusses the problem of coverage holes being created when capacity base stations enter energy saving mode. Accordingly, base stations are also able to enter "compensation" mode, in which the base station serves one or more UEs previously served by the base station that has entered energy saving mode. This may be achieved by a simple handover of the UEs to the coverage base station, or may be a handover to a new base station (e.g. a neighboring base station). The compensation base station may also require a substantial change in its coverage area in order to serve the new UEs.

A further 3GPP specification, TR 36.927, discusses potential solutions for energy saving and highlights policies for "re-activation" of base stations (i.e. exiting energy saving mode). These policies include:

No assistance—in which the coverage base station instructs the capacity base station to exit energy saving mode without any knowledge of its local conditions;

Reactivation based on load;

Reactivation based on Interference over Thermal (IoT) measurements;

Reactivation based on UE measurements; and

Reactivation based on UE and base station locations.

SUMMARY

According to a first aspect of the disclosure, there is provided a method of operating a base station in a cellular telecommunications network, the base station having normal, compensation and energy saving modes of operation and being configured to switch between the normal, compensation and energy saving modes of operation, the method comprising the first base station sending a first message to a second base station, the first message including energy saving mode data for the first base station indicating that the first base station is of a first network operator's network; the first base station receiving a second message, the second message being responsive to the energy saving mode data; and the first base station determining whether to enter the energy saving mode of operation based on the second message. The energy saving mode data may relate to the first base station requesting that the second base station act in compensation mode for the first base station.

According to a second aspect of the disclosure, there is provided a method of operating a base station in a cellular telecommunications network, the base station having normal, compensation and energy saving modes of operation and being configured to switch between the normal, compensation and energy saving modes of operation, the method comprising the first base station receiving a first message from a second base station, the first message including energy saving mode data for the second base station indicating that the second base station is of a first network operator's network; and the first base station making a determination of whether to enter the compensation mode of operation based on the first message. The energy saving mode data may relate to the second base station requesting that the first base station act in compensation mode for the second base station.

Accordingly, a base station of another Network Operator may compensate for the base station entering energy saving mode if a suitable Neutral Hosting Arrangement, NHA, is, or can be, established. The decision on which base station to reactivate (and the parameters of the reactivation) may also be based on the NHA.

According to a third aspect of the disclosure, there is provided a method of operating a base station in a cellular telecommunications network, the base station having normal, compensation and energy saving modes of operation and being configured to switch between the normal, compensation and energy saving modes of operation, the method comprising the first base station sending a first message to a second base station, the first message including energy saving mode data for the first base station, the energy saving mode data relating to the first base station requesting that the second base station act in compensation mode for the first base station; the first base station receiving a second message, the second message being responsive to the energy saving mode data for the first base station, and including energy saving mode data for the second base station including a request that the first base station act in compensation mode for the second base station; and the first base station entering compensation mode and compensating for the second base station.

According to a fourth aspect of the disclosure, there is provided a method of operating a base station in a cellular telecommunications network, the base station having normal, compensation and energy saving modes of operation and being configured to switch between the normal, compensation and energy saving modes of operation, the method comprising the first base station receiving a first message from a second base station, the first message including energy saving mode data for the second base station including a request that the first base station act in compensation mode for the second base station; the first base station sending a second message to the second base station, the second message including energy saving mode data for the first base station including a request that the second base station act in compensation mode for the first base station; and the first base station entering energy saving mode.

Embodiments of the third and fourth aspects of the present disclosure therefore provide the advantage that base stations may negotiate with other base stations to determine which base station should become the compensator.

According to a fifth aspect of the disclosure, there is provided a computer program comprising instructions which, when the program is executed by a computer, cause the computer to carry out the method in any one of the first, second, third or fourth aspects of the disclosure.

According to a sixth aspect of the disclosure, there is provided a base station comprising a transceiver, a processor and memory, wherein the processor is configured to perform the method of any one of the first, second, third or fourth aspects of the disclosure. The base station may be part of a cellular telecommunications network.

BRIEF DESCRIPTION OF THE FIGURES

In order that the present disclosure may be better understood, embodiments thereof will now be described, by way of example only, with reference to the accompanying drawings in which:

FIG. 5 is a table representing data in a Neighbour Relations Table (NRT) of a base station of FIG. 4.

FIG. 7 is a table representing data in an NRT of a base station of FIG. 6.

FIG. 10 is a table representing data in an NRT of a base station of FIG. 9.

DETAILED DESCRIPTION OF EMBODIMENTS

Figure 1:
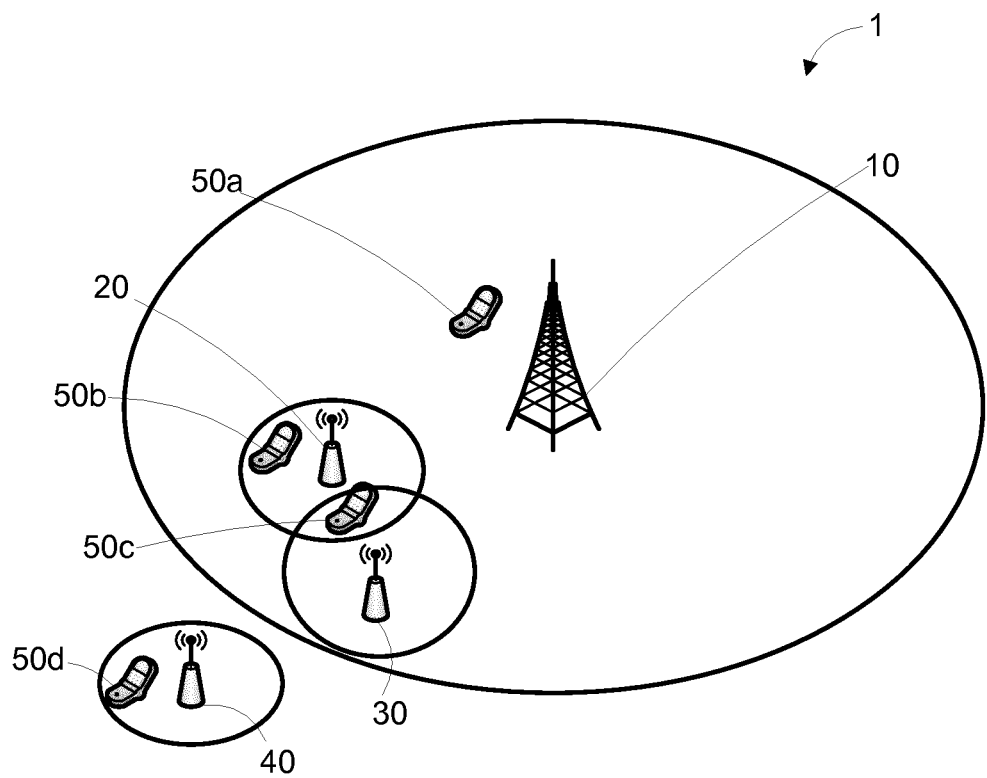
FIG. 1 is a schematic diagram of a first embodiment of a cellular telecommunications network.

A cellular telecommunications network 1 of a first embodiment of the disclosure is illustrated in FIG. 1. The network 1 includes a first base station 10, which in this embodiment is an evolved Node B (hereinafter, "eNB") and second, third and fourth base stations 20, 30, 40, which in this embodiment are Home eNBs, which are otherwise known as small cells, or femtocells, picocells, metrocells, or microcells depending on the coverage area. For the remainder of this specification, these base stations will be referred to as the first, second, third and fourth eNB 10, 20, 30, 40, respectively. The base stations' coverage areas are illustrated by the enveloping ellipses, which represent the propagation distances for signals transmitted by each base station to one or more UEs. In FIG. 1, a single UE 50a, 50b, 50c, 50d is connected to each base station, although in practice each base station can be connected to many UEs. In this embodiment, the base stations use the $4^{th}$ Generation (4G) Long-Term Evolution (LTE) protocol for such transmissions.

The eNBs 10, 20, 30, 40 are also connected to at least one Core Network (not shown) of a Network Operator. If the base station is connected to multiple Core Networks (e.g. two or more Core Networks of two or more respective Network Operators using the SI-flex protocol), then the base station hardware may be used by either Operator.

Figure 2:
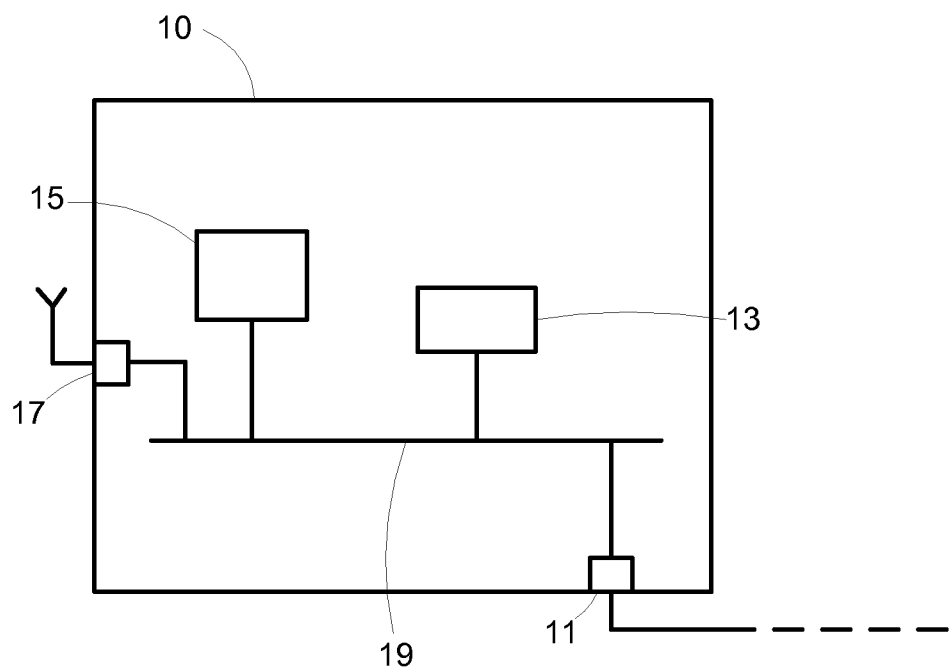
FIG. 2 is a schematic diagram of a base station of the network of FIG. 1.

FIG. 2 is a schematic diagram representing various components of the first eNB 10. The first eNB 10 includes a first transceiver 11, a processor 13, a memory 15, and a second transceiver 17, all connected via bus 19. The first transceiver 11 is commonly known as the backhaul connection and is used for transmissions to and from the Core Network, which would typically be via a carrier-grade Ethernet or fiber connection for the first eNB 10. The second transceiver 17 is an antenna configured for cellular communications (in this embodiment, via the 4G LTE protocol) with any connected UEs. The processor 13 typically processes data packets received via the first transceiver 11 or second transceiver 17 such that they are in a form to be transmitted to their destination (for example, IP data packets received at the first transceiver 11 from the Core Network may be processed into Transport Blocks (TBs) by the processor 13 for onward transmission to a UE via the second transceiver 17, which may be temporarily stored in a buffer in memory 15).

In this embodiment, the first eNB 10 has three defined modes of operation. The first mode is hereinafter known as "normal" mode. Characteristics of normal mode include:
- the first eNB 10 is configured to transmit physical broadcast channel signals (e.g. reference signals);
- the first eNB 10 is configured to accept connections from UEs;
- the first eNB 10 is configured to serve any connected UEs, such as by forwarding any messages between the UE and the Core Network; and
- the first eNB 10 is configured to transmit signals to any connected UEs via the transceiver 11 using a range of power levels defined by its operational protocol.

The skilled person will understand that this mode of operation is commonly used by base stations and the energy usage of any particular base station in this mode can vary based on, for example, the number of connected UEs, the distances of the connected UEs to the base station, and the data requirements of the connected UEs.

The second mode of operation of the first eNB 10 is hereinafter known as "energy saving mode". Characteristics of energy saving mode include:

- the first eNB 10 does not transmit physical broadcast channel signals, or transmits fewer physical broadcast channel signals (compared to normal mode)
- the first eNB 10 does not accept connections from UEs, or is configured to accept a reduced number of connections from UEs (compared to normal mode);
- the first eNB 10 does not serve any UEs, or is configured to serve a reduced number of UEs (compared to normal mode);
- the first eNB 10 reduces the number of processes performed by processor 13 (compared to normal mode); and
- the first eNB 10 does not transmit signals to any connected UEs, or is configured to transmit to any connected UE at a relatively low power level (compared to normal mode).

The skilled person will understand, based on the above teaching, that the energy saving mode of operation is therefore used to reduce the energy consumption of a base station. The base station operating in energy saving mode will therefore use less energy than the same base station operating in normal mode in substantially similar conditions.

The first eNB 10 should avoid switching from normal to energy saving mode when it has a connected UE, as that UE may suddenly experience a reduced Quality of Service (QoS), or no service should the first eNB 10 be configured to not serve the UE at all when in energy saving mode. Accordingly, the first eNB 10 must manage its transition to energy saving mode to avoid a reduction in QoS for any connected UE. This may include a passive transition in which no new connections from UEs are accepted and the first eNB 10 waits for any connected UEs to disconnect and handover to another base station. Alternatively, this may be an active transition in which no new connections from UEs are accepted and the first eNB 10 causes the UEs to handover to another base station.

The third mode of operation of the first eNB 10 is known as "compensation mode". The characteristics of compensation mode are similar to normal mode, but further include:

- the first eNB 10 is configured to accept connections from UEs that were previously served by a base station that is entering (or has entered) energy saving mode;
- the first eNB 10 serves any UEs that were previously served by a base station that is entering (or has entered) energy saving mode; and
- the first eNB 10 modifies its configuration in order to take the responsibilities of the base station entering energy saving mode, which may include one or more of:
  - the first eNB 10 modifying its coverage area (e.g. increases its coverage area by increasing the upper limit of its power range of transmissions from the second transceiver 17) to serve the UEs that were previously served by a base station that has entered energy saving mode;
  - the first eNB 10 increasing its processing power;
  - the first eNB 10 increasing its radio capacity (such as by using previously disabled antennas); and
  - the first eNB 10 adopting different services (e.g. a different protocol).

This compensation mode is therefore used by the first eNB 10 to compensate for the loss of coverage and/or service that was the responsibility of the other base station that is now entering energy saving mode. Although this may result in an increase in energy consumption for the first eNB 10, any such increases are generally more than offset by the overall reduction in energy consumption in the network 1 as a result of one or more other base stations entering energy saving mode.

In this embodiment, the first eNB 10 is able to switch between the three modes of operation (e.g. between normal and compensation mode and vice versa, between normal and energy saving mode and vice versa, and between energy saving mode and compensation mode and vice versa). Any change in operational mode may be effected by the base station adopting one or more of the characteristics outlined above.

In this embodiment, the second, third and fourth eNB 20, 30, 40 have a similar construction as outlined above for the first eNB 10. The skilled person will understand that some physical elements of the eNBs 20, 30, 40 may differ to the first eNB 10 (as they are Home eNBs in this embodiment), but the concepts above of the normal, energy saving and compensation modes of operation apply equally to the second, third and fourth eNBs 20, 30, 40.

Embodiments of methods of the present disclosure will now be described based on the network elements described above. In these embodiments, base stations are able to negotiate changes in their mode of operation.

A first embodiment of the present disclosure will now be described with reference to FIGS. 3 to 7. In this embodiment, the first, second, third and fourth eNBs 10, 20, 30, 40 are all operating in normal mode, are all connected to a Core Network of a single Network Operator, and are each communicating with at least one UE 50a, 50b, 50c, 50d. Furthermore, each base station stores a Neighbor Relations Table, NRT, in memory, which stores identifying information regarding each base station (such as the evolved Cell Global Identifier, eCGI, and other X2 connection information) in the network 1. The NRT is also used to store data relating to the operational mode of each neighboring base station (details of the structure of this data and the mechanisms for updating it are described later in this description).

In this embodiment, the third eNB 30 determines that it should enter energy saving mode. This determination is made by the processor and may be triggered upon, for example, its load being below a threshold. Following this determination, the third eNB 30 looks up the identifying eCGIs of its neighbor base stations, sets up an X2 connection (e.g. by querying the Mobility Management Entity, MME, of the Core Network with the eCGI) with each neighboring base station if one has not already been established, and sends a first X2 message to each base station. The first X2 message includes:

- an indication that the third eNB 30 intends on entering energy saving mode;
- a request for the base station receiving the first X2 message to compensate for the third eNB 30;
- an indication of the number of UEs connected to the third eNB 30 (just one in this example);
- location information of the third eNB 30 (e.g. Global Navigation Satellite System, GNSS, coordinates);
- a measure of the third eNB's power level;
- an indication of the third eNB's load (this may be current and forecast);
- an indication of the third eNB's required level of compensation (e.g. guaranteed full coverage, best effort compensation, compensation for existing UEs only); and
- an estimate of a time period that the third eNB intends on being in energy saving mode for.

Each base station receiving the first X2 message then makes a determination, based on the data in the first X2 message, whether it can compensate for the third eNB 30. In this example, the second eNB 20 makes a positive determination and responds to the first X2 message with a second X2 message indicating that the second eNB 20 will compensate for the third eNB 30.

The third eNB 30 then sends a third X2 message to the second eNB 20 which includes data regarding the third eNB 30 (hereinafter known as "compensation data"). In this embodiment, this compensation data includes:

- the third eNB's capabilities, such as
  - its configuration (i.e. maximum power, E-UTRAN Absolute Radio-Frequency Channel Numbers (EARFCNs), etc.);
  - its services (i.e. 2/3/4G, WiFi, VoLTE, VoWiFi, voice, video, etc.)
  - its QoS (i.e. guarantees regarding reliability, latency, etc.)
- the eCGI of each base station that has offered to compensate for the third eNB 30 (just the second eNB 20 in this example);
- information regarding its neighboring base stations (e.g. eCGI, PCI, X2 information);
- an identifier (e.g. IMSI) of each UE that the third eNB 30 serves; and
- a power consumption reading for the third eNB (this could be split into several readings identifying, for example, average and peak power consumptions, power consumption in energy saving mode, power consumption when particular services are active, etc.).

Figure 3:
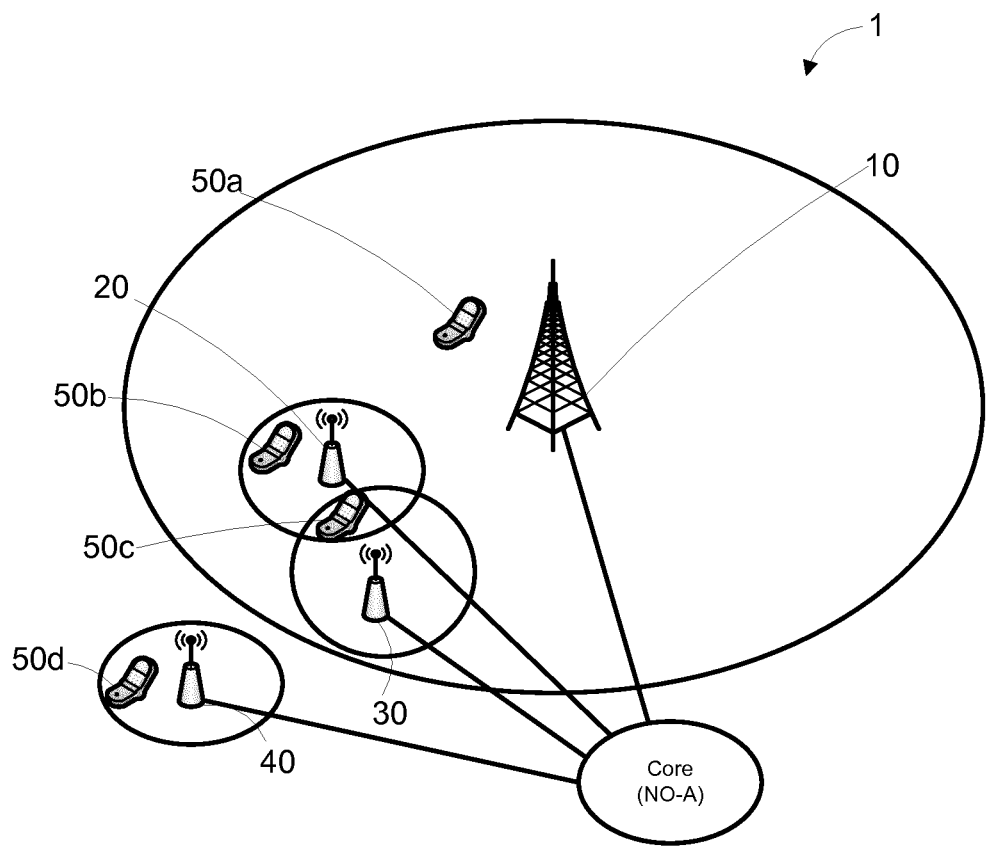
FIG. 3 is a schematic diagram of a second embodiment of a cellular telecommunications network.

On receipt of the third X2 message, the second eNB 20 knows that it is the only base station that will compensate for the third eNB 30 (as it is the only base station identified in the third X2 message as willing to compensate) and must therefore provide full compensation for its services and coverage. This may be contrasted to the case, described later in this description, in which there are multiple compensators. Furthermore, as shown in FIG. 3, the second eNB 20 does not need to modify its coverage area in order to provide coverage and service for the UE 50c.

Once the third X2 message has been successfully sent to the second eNB 20 (which may be indicated using acknowledgment messages), then the third eNB 30 starts its transition to energy saving mode. This transition includes the following:

- the third eNB 30 instructs its connected UE 50c to handover to the second eNB 20;
- the third eNB 30 sends a fourth X2 message to all neighboring base stations in its NRT indicating that it is entering energy saving mode and that the second eNB 20 is the compensating base station; and, following a successful handover of the UE 50c,
- entering energy saving mode (such as by adopting one or more of the characteristics outlined above).

Upon receipt of the fourth X2 message at the second eNB 20, the second eNB 20 is configured to send a fifth X2 message to all neighboring base stations of the third eNB 30 (as identified previously in the X2 message, which may require first establishing the necessary X2 connection) and to the Operations and Management (OAM) module of the Core Network. The fifth X2 message contains all data values from the third X2 message.

The NRT data will now be described in more detail. As noted above, each neighboring base station of the third eNB 30 receives the first and fourth X2 messages, and each neighboring base station receives the data contained in the third X2 message either from the third X2 message (for the second eNB 20) or from the fifth X2 message (for all other neighboring base stations). Each base station contains an NRT in memory, and this is updated with information upon receipt of these messages. The NRT of this embodiment therefore contains more information than a basic NRT of the prior art. The base stations therefore store common information in their NRTs regarding their neighboring base stations and other data relevant for the present disclosure. The relevance of this data will become apparent when discussing re-activation later in the description.

Figure 4:
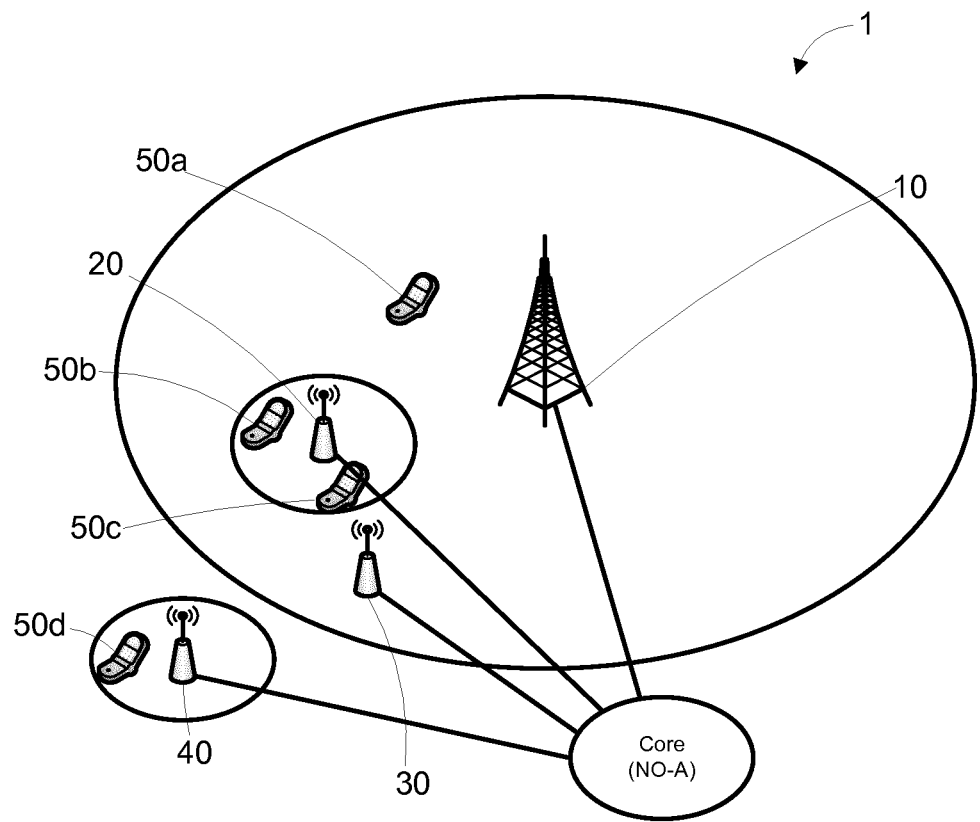
FIG. 4 is a schematic diagram of the network of FIG. 3 following a transition in base station operational mode.

FIG. 4 illustrates the state of the network 1 following the switch of the third eNB 30 to energy saving mode and of the second eNB 20 to compensation mode. As shown, the third eNB 30 no longer has an enveloping ellipse as it is no longer transmitting signals about a coverage area. The UE 50c is now served by the second eNB 20. An example of the common data stored in the NRT of each base station is shown in FIG. 5.

At a subsequent time, the second eNB 20 also determines that it should switch from compensation mode to energy saving mode. This, again, may be determined following the second eNB's 20 load dropping below a threshold. Similar to the technique used above, the second eNB 20 looks up the identifying eCGIs of its neighbor base stations, sets up an X2 connection (e.g. by querying the Mobility Management Entity, MME, of the Core Network with the eCGI) with each neighbor if one hasn't already been established, and sends a first X2 message to each base station. As in the example above, the first X2 message includes an indicator that the second eNB 20 intends on entering energy saving mode, a request for the base station receiving the first X2 message to compensate for the second eNB 20, and data relevant for the neighboring base stations to make a determination of whether they can compensate for the second eNB 20.

As the second eNB 20 is already compensating for the third eNB 30, the first X2 message includes the data points identified above (that is, an identifier, a request for compensation, an indication of the number of UEs and load, and location information) for both the second eNB 20 and the third eNB 30.

In this embodiment, the second eNB 20 receives second X2 messages from both the first eNB 10 and the fourth eNB 40. These messages indicate that the first eNB 10 and fourth eNB 40 will compensate for the second eNB 20. In response, the second eNB 20 sends third X2 messages to both the first eNB 10 and fourth eNB 40 including compensation data. This compensation data includes the information discussed above, and therefore informs the neighboring base stations that both the first eNB 10 and fourth eNB 40 are to compensate for the second and third eNBs 20, 30.

When the first eNB 10 and fourth eNB 40 receive this third X2 message, the first eNB 10 is informed that the fourth eNB 40 will also compensate and vice versa. Accordingly, the first eNB 10 and fourth eNB 40 exchange messages to determine how the services and coverage of the second and third eNBs 20, 30 should be shared. In this example, the two base stations decide that the capabilities of the third eNB 30 should be compensated for by the fourth eNB 40 and the capabilities of the second eNB 20 should be compensated for by the first eNB 10 (this is based on the location data of the base stations as discovered in the compensation data).

In this embodiment, the coverage area of the fourth eNB 40 does not cover UE 50c of the third eNB 30. However, the fourth eNB 40 is able to estimate an increase in transmission power required to compensate for the third eNB 30 going into energy saving mode. In this embodiment, the increase in transmission power is based on the power level of the third eNB 30 plus an estimated propagation loss between the third and fourth eNBs 30, 40. The propagation loss may be estimated based on the distance between the two base stations (which has been identified by the GNSS coordinates from the first X2 message), or alternatively the fourth eNB 40 may measure the signal strength of the third eNB 30 and the propagation loss will be the difference between the transmission power (identified in the first X2 message) and the measured signal strength. The fourth eNB 40 may then increase its transmission power by a corresponding amount.

Once the third X2 message has been successfully sent to the first eNB 10 and fourth eNB 40 (which again may be confirmed with acknowledgement messages), then the second eNB 20 starts its transition to energy saving mode. This transition includes:

- the second eNB 20 instructs its connected UEs 50b, 50c to handover to the first eNB 10 and fourth eNB 40 respectively;
- the second HeNb 20 sends a fourth X2 message to all neighboring base stations in its NRT indicating that it is entering energy saving mode and that the first eNB 10 and fourth eNB 40 are compensating base stations; and, following a successful handover of the UEs 50b, 50c,
- entering energy saving mode (such as by adopting one or more the characteristics outlined above).

Upon receipt of the fourth X2 message at the first eNB 10 and fourth eNB 40, both base stations send a fifth X2 message to all neighboring base stations of the second eNB 20 (as identified previously in the NRT of the third X2 message) and to the OAM of the Core Network. The fifth X2 message contains all data values from the third X2 message, such that the neighboring base stations can update their NRTs with the latest compensation data (including the configuration change of the fourth eNB 40).

Figure 6:
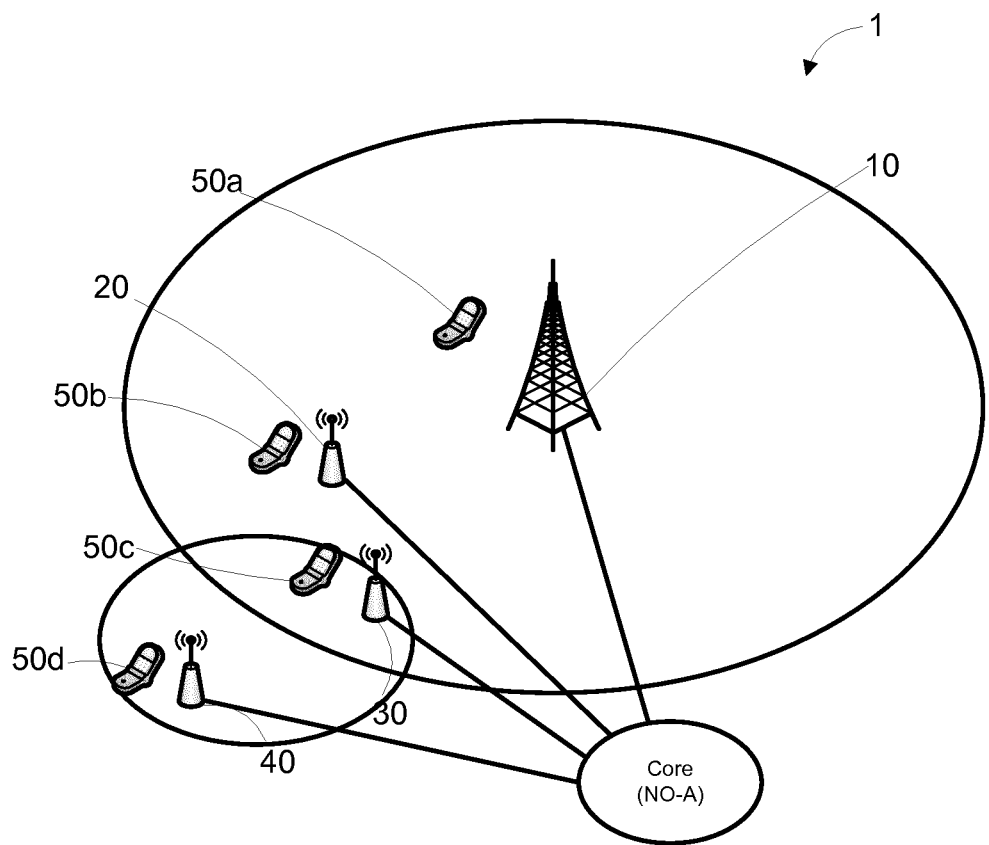
FIG. 6 is a schematic diagram of the network of FIG. 4 following a further transition in base station operational mode.

FIG. 6 illustrates the state of the network 1 following this transition. As shown, the second and third eNBs 20, 30 no longer have enveloping ellipses as they are no longer transmitting signals about a coverage area. The UEs 50b, 50c are now served by the first eNB 10 and fourth eNB 40, respectively (with the fourth eNB's 40 coverage area suitably increased). FIG. 7 illustrates the data contained in the NRT of each base station following this transition. The data identifies the third eNB 30 as an "inherited" base station. The third eNB 30 is inherited in the sense that the first eNB 10 is now compensating for that base station, but another base station was previously compensating for it. The data also identifies the power increase required for the fourth eNB 40 to act in compensation mode for it.

There are further examples of how two base stations may negotiate their status between the three operational modes than those described above. For example, on receipt of the first X2 message, all neighboring base stations may indicate (via the second X2 message) that they cannot compensate for the base station making the request. The requesting base station will therefore not go into energy saving mode. This is advantageous over the prior art as it is therefore not possible for a base station to go into energy saving mode and put an impossible strain on its neighbors.

Furthermore, on receipt of the first X2 message, the neighboring base station may also send a first X2 message back to the original base station. The two base stations may then negotiate which of the two should go into energy saving mode and which should go into compensation mode. It may therefore transpire that the base station sending the original first X2 message compensates for the neighboring base station, and may also inherit further base stations to compensate for.

In another scenario, the neighboring base station may indicate that a different base station may compensate for it. Furthermore, following receipt of the first X2 message, the neighboring base station may negotiate with other neighboring base stations which one (or several) should compensate for the requesting base station.

As can be seen from the above examples, there is no longer the defined linkage between "coverage" base stations and "capacity" base stations, in which the coverage base station controls the energy saving state of the capacity base station, as in the prior art. Instead, the present invention proposes a mechanism by which base stations can switch between any one of the three modes of operation (normal, energy saving, compensation), and compensation can be provided dynamically by one on more if its neighboring base stations.

In the above examples, the first X2 message is sent to all the neighboring base stations in the NRT. However, this is non-essential. In other embodiments, the first X2 message may be sent to a single neighbor or a subset of neighbors. The choice of neighbors may be based on known characteristics of the neighbor (e.g. their location) or their prior performance when acting as a compensator (e.g. based on measurable Key Performance Indicators, KPIs, during said prior performance).

In the above embodiments, the neighboring base station makes a determination on whether to become a compensator for another base station following receipt of the first X2 message. This determination may be based on, for example:

- the base station's current and forecast load;
- the current and forecast load in the area of the base station;
- the base station's power consumption;
- the base station's estimated energy increase to compensate for the other base station; and
- KPIs of prior performances when acting as compensator for the other base station.

Furthermore, a base station may store a measure of its KPIs when acting as a compensator for another base station in memory. This may also be associated with its configuration profile at that time. Accordingly, upon future requests to compensate for the other base station, the base station may reconfigure to use that configuration profile.

Figure 8:
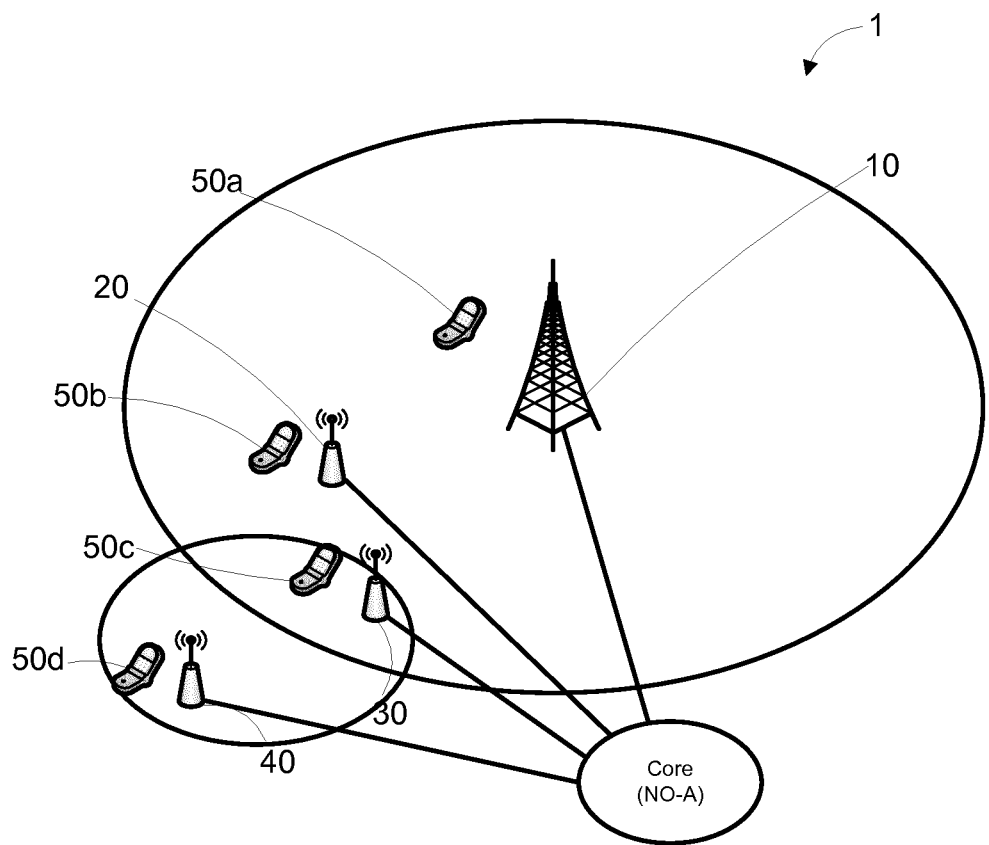
FIG. 8 is a schematic diagram of a third embodiment of a cellular telecommunications network.

A further embodiment of the present disclosure will now be described, with reference to FIGS. 8 to 10. The starting point for the following example is based on the network as described in the previous embodiment and shown in FIG. 8 (such that the second and third eNBs 20, 30 are in energy saving mode and the first eNB 10 and fourth eNB 40 are compensating for those base stations).

At a subsequent point in time, a decision is made to re-activate the third eNB 30 as the load on the first eNB 10 is above a threshold. In this embodiment, the decision is made by the first eNB 10 and not only causes the third eNB 30 to switch out of energy saving mode, but also causes the third eNB 30 to compensate for the second eNB 20. Accordingly, the first eNB 10 sends a sixth X2 message to the third eNB 30, which includes:

- an instruction for the third eNB 30 to switch out of energy saving mode;
- compensation data for the second eNB 20;
- an instruction for the third eNB 30 to enter compensation mode and compensate for the second eNB 20.

The third eNB 30 reacts to these instructions by switching from energy saving mode to compensation mode (by adopting one or more of the characteristics outlined above), which in this example involves a modification of its transmission power in order to cover the second eNB 20. This modification may be calculated in a similar manner as described in the previous embodiment.

The first eNB 10 updates its NRT to reflect the above changes. Furthermore, the first eNB 10 sends a seventh X2 message to all neighboring base stations of the third eNB 30 to inform them that the third eNB 30 has reactivated and that the third eNB 30 is now compensating for the second eNB 20. All neighboring base stations update their records in their NRT.

Also, the fourth eNB 40 reacts to the seventh X2 message by switching from compensation mode to normal mode (as it no longer needs to compensate for the third eNB 30). In this embodiment, this switch involves a reversal of the configuration changes applied by the fourth eNB 40 when compensating for the third eNB 30.

Figure 9:
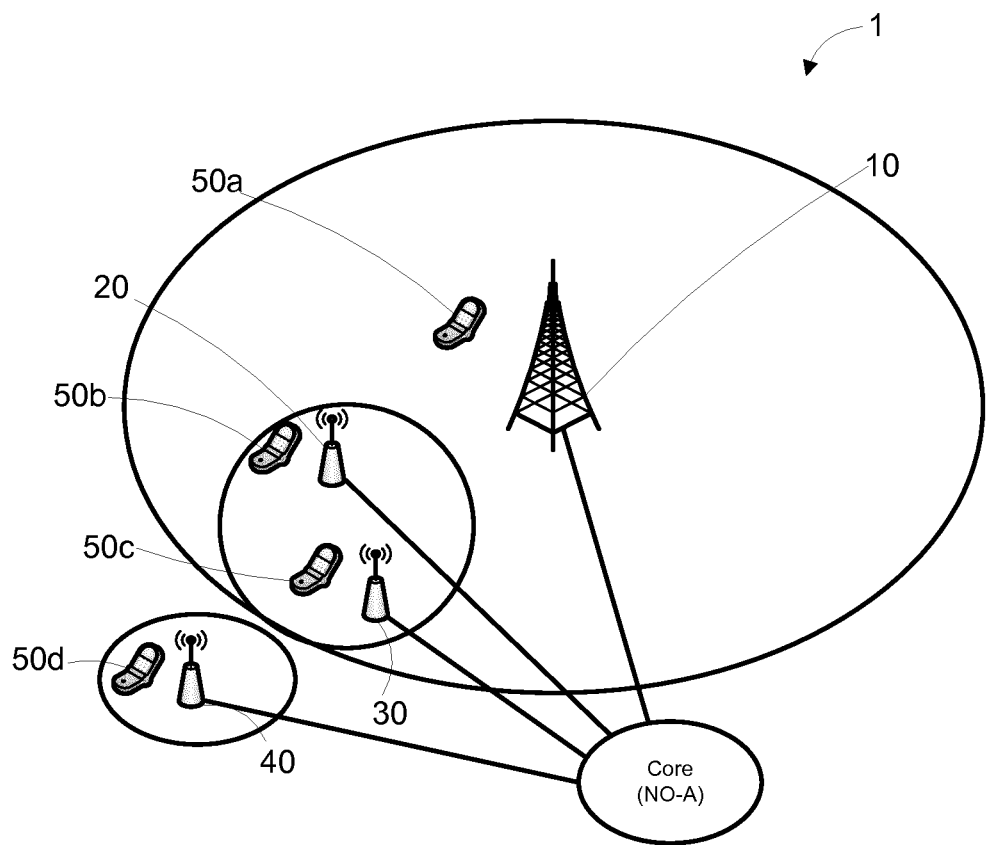
FIG. 9 is a schematic diagram of the network of FIG. 8 following a transition in base station operational mode.

Following these changes, the network is as shown in FIG. 9. The fourth eNB 40 has reduced its coverage area to its previous state and is no longer compensating for the third eNB 30, the first eNB 10 is no longer compensating for the second or third eNB 20, 30, and the third eNB 30 has modified its coverage area to compensate for the second eNB 20.

The information stored in each NRT of the base stations is shown in FIG. 10.

In this embodiment, a determination was made by the first eNB 10 to reactivate the third eNB 30 and for the third eNB 30 to thereafter compensate for the second eNB 20. As discussed above, each base station records in its NRT various data points regarding each base station in the network, including the configuration parameters of the base stations in energy saving mode, and any configuration changes the compensating base station needed to make in order to compensate. The determination on whether a base station should reactivate another base station can be made based on this data. In this manner, an informed decision can be made on which base station to reactivate in order to appropriately balance the capacity and energy consumption of the network, or such that the services offered by the reactivated base station is such that it may compensate using an appropriate configuration (e.g. based on the services required), the reactivated base station can be reactivated using the appropriate configuration parameters, and the compensation base station can be reconfigured to its previous state.

In alternative arrangements, the decision to reactivate a base station in an energy saving state can be made by another entity than the compensating base station—such as another base station, an entity in the Core Network, or the energy saving base station itself. In these alternative arrangements, it is preferable that information that such an event has occurred be recorded in each base station's NRT. This can be achieved by the entity instructing the base station to exit energy saving mode sending messages to its neighbors (equivalent to the seventh X2 message in the embodiment above), or each base station polling an energy saving base station to determine if it has reactivated.

Another embodiment of the disclosure will now be described with reference to FIGS. 11 to 12. This embodiment includes a cellular network 101, having first, second, third and fourth eNBs 110, 120, 130, 140 and their respective UEs 150*a*, 150*b*, 150*c*, 150*d*. These components are substantially similar in construction as those described in the previous embodiments.

Figure 11:
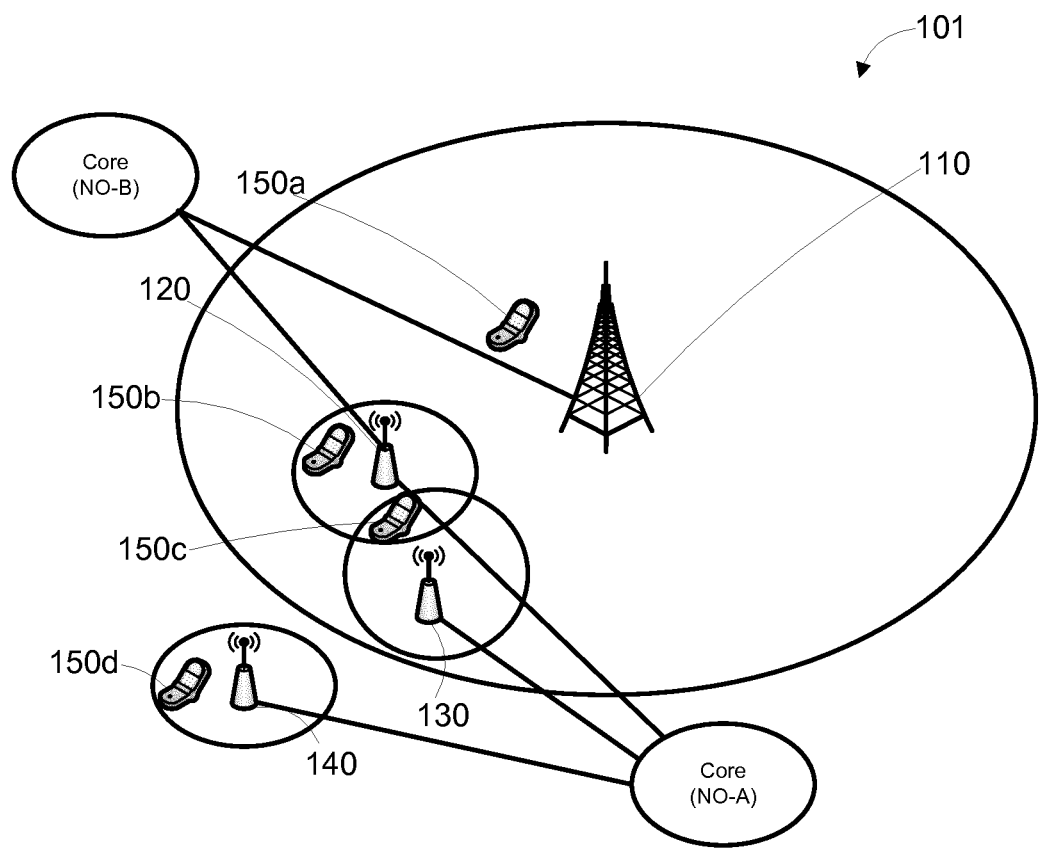
FIG. 11 is a schematic diagram of a fourth embodiment of a cellular telecommunications network.
Figure 12:
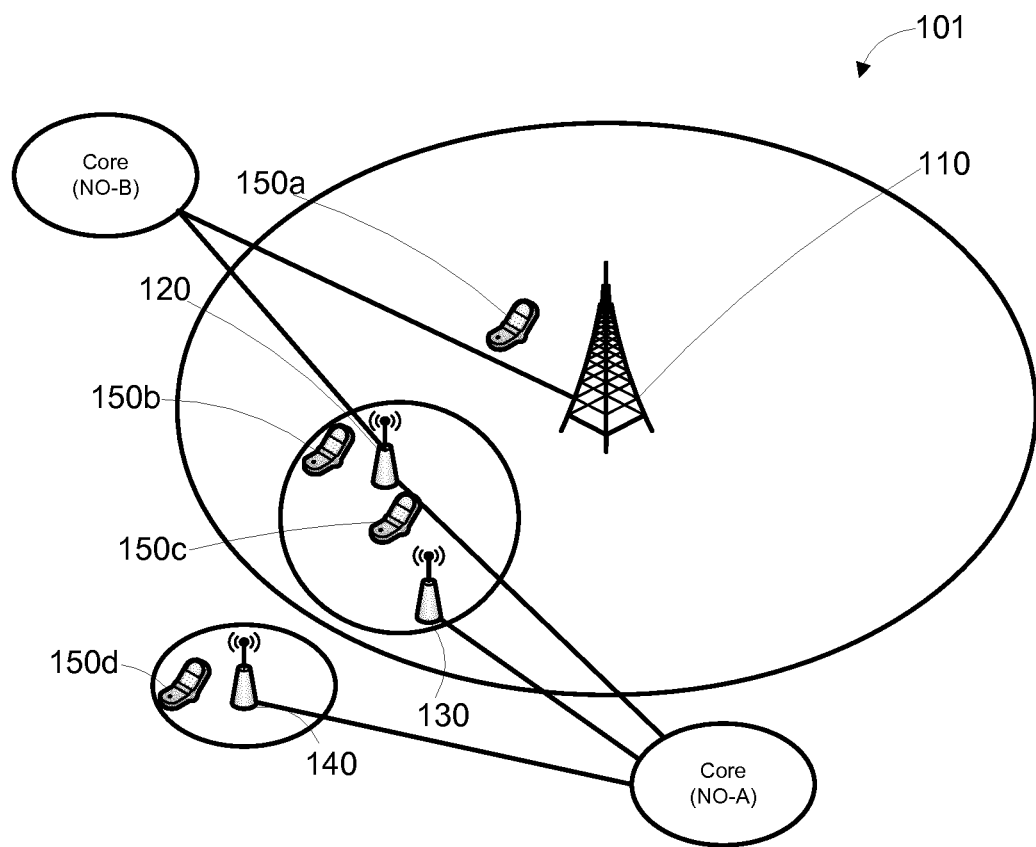
FIG. 12 is a schematic diagram of the network of FIG. 11 following a transition in base station operational mode.

Also shown in FIG. 11 is a first and second Core Network, controlled by Network Operator A and Network Operator B, respectively. The third and fourth eNBs 130, 140 are connected to Network Operator A's Core Network, the first eNB 110 is connected to Network Operator B's Core Network, and the second eNB 120 is connected to both Network Operator A and B's Core Networks (e.g. via S1 flex). The second eNB 120 is primarily serving the second Network Operator, but has a Neutral Hosting Agreement (NHA) which allows it to serve UEs of the first Network Operator.

The network 100 is initially in a state as shown in FIG. 11, such that all base stations are in their normal mode of operation and are serving their respective UEs. Each base station includes an NRT in its memory, which stores identifying information (e.g. eCGI) of all neighboring base stations. This typically stores data of base stations operated by the same Network Operator, but may also include data of base stations operated by other Network Operators if an NHA and suitable S1-flex connection have been established. Accordingly, the first eNB 110 stores data on the other base station of the second Network Operator (the second eNB 120), the second eNB 120 stores data on the other base stations of the first and second Network Operators (the first, third and fourth eNBs 110, 130, 140), the third eNB 130 stores data on the other base stations of the first Network Operator (the second and fourth eNB 120, 140), and the fourth eNB 140 stores data on the other base stations of the first Network Operator (the second and third eNB 120, 130).

At a subsequent point in time, the third eNB 130 determines that it should enter energy saving mode. The third eNB 130 therefore compiles and issues a first X2 message, including:
  an indication that the third eNB 130 intends on entering energy saving mode;
  a request for another base station to compensate for the third eNB 130;
  an indication of the number of UEs connected to the third eNB 130 (just one in this example);
  location information of the third eNB 130 (e.g. Global Navigation Satellite System, GNSS, coordinates);
  a measure of the third eNB's power level;
  an indication of the third eNB's load (this may be current and forecast);
  an estimate of a time period the third eNB 130 is intending on being in energy saving mode for;
  an indication of the third eNB's required level of compensation (e.g. guaranteed full coverage, best effort compensation, compensation for existing UEs only);
  an indication of the third eNB's 130 primary operator (NO-A in this example); and
  an indication of other operators the third eNB 130 may operate for (NO-B in this example).

The first X2 message is sent to each base station in the third eNB's 130 NRT—the second and fourth eNB 120, 140. Both base stations respond with a second X2 message indicating that they will compensate for the third eNB 130.

As described above for a previous embodiment, the third eNB 130 sends a third X2 message to each base station that has responded positively. This includes the eCGI of each base station that has offered to compensate for the third eNB 130, and an identifier of the Network Operator that owns it. This triggers a negotiation between the second and fourth eNBs 120, 140 to determine which base station should compensate for the third eNB 130. As noted above, the second eNB 120 is primarily serving the second Network Operator, but has a NHA such that it may also serve the first Network Operator. The fourth eNB 140 serves the same Network Operator, but must increase its coverage area by a greater amount (and therefore energy consumption) than the second eNB 120 in order to compensate for the third eNB 130. Accordingly, the two base stations determine that the second eNB 120 should compensate for the third eNB 130 (this determination may also be based on the financial implication of the second eNB 120 being the compensator, based on the NHA).

Following this determination, the method proceeds as in the previous embodiments such that all base stations are updated with the compensation data, the second eNB 120 increases its coverage area to compensate for the third eNB 130, the third eNB's UE is handed over to the second eNB 120, and the third eNB 130 enters energy saving mode. In this embodiment, the compensation data includes an indication that there is a NHA in place between the Network Operators, and includes details of the NHA (e.g. maximum data rates, time of expiry etc.). The state of the network following this transition is shown in FIG. 12.

At a subsequent time, a determination may be made to reactivate the third eNB 130. The determination is again made on the compensation data, which in this embodiment includes details of the NHA between the energy saving base station's Network Operator and the compensating base station's Network Operator. For example, if the NHA is to end in the next hour, then the compensating base station may instruct the energy saving base station to exit energy saving mode.

In the above embodiment, the NHA between the first and second Network Operators is already in place. However, in an alternative arrangement, the NHA could be established and/or negotiated between the two Network Operators upon receipt of the first X2 message. For example, an S1 flex connection could be established between the two Network Operators, and the relevant parameters of a new NHA could be negotiated, in order for the base station to compensate for a base station of another network.

In the above embodiments, the base stations negotiate and control their modes of operation via several new inter-base station messages carried over the X2 protocol. However, this is not essential. For example, the data contained in the messages defined above may be based on modifications of existing inter-base station messages used in current cellular networks. Furthermore, these messages may be contained in the same or distinct signals.

Furthermore, it is also non-essential that the method of the above embodiments of the disclosure be carried out in a distributed manner. For example, all of the above messages could be routed through a centralized entity (such as an Operations and Management (OAM) node of the Core Network), which stores and processes the data in order to determine which base stations should be in the particular modes of operation. In this manner, the OAM node may determine which allocation of modes of operation amongst the network of base stations results in suitable coverage and capacity for the network whilst keeping energy consumption to a minimum.

In the above embodiments, the base stations are all eNBs. However, any form of base station is suitable for embodiments of the present disclosure (e.g. a base station of any cellular telecommunications protocol, including small cells). Furthermore, the functionality of the base station may be split between different entities, such that a centralized entity performs some functions (typically processing the higher levels of the protocol stack), whilst one or more remote radios perform other functions (typically processing the lower levels of the protocol stack).

In the above embodiments, the base stations either wait for their connected UEs to disconnect, or cause their connected UEs to disconnect, prior to entering energy saving mode. The base station may cause the UEs to disconnect either by an explicit message or by gradually reducing their transmission power in order to trigger a handover by the UE.

In the above embodiments, a compensation base station instructs an energy saving base station to exit energy saving mode. Thereafter, the compensation base station enters normal mode as it no longer has to compensate for that base station. However, the skilled person will understand that the compensation base station may be compensating for multiple energy saving base stations, and may instruct one or a subset of these to exit energy saving mode. Accordingly, the compensation base station may still be in compensation mode following a reactivation event.

The skilled person will understand that any combination of elements is possible within the scope of the invention, as claimed.

The disclosure may be defined by the following clauses:

1. A method of operating a base station in a cellular telecommunications network, the base station having normal, compensation and energy saving modes of operation, the method comprising: a first base station being configured to switch between the normal, compensation and energy saving modes of operation.

2. A method as defined in clause 1, further comprising: the first base station sending a first message to a second base station, the first message including energy saving mode data for the first base station; the first base station receiving a second message, the second message being responsive to the energy saving mode data; and the first base station determining whether to enter the energy saving mode of operation based on the second message.

3. A method as defined in clause 2, wherein the energy saving mode data relates to the first base station requesting that the second base station act in compensation mode for the first base station.

4. A method as defined in clause 3, wherein the second message indicates that the second base station will act in compensation mode for the first base station.

5. A method as defined in clause 3 or clause 4, wherein the second message indicates that a third base station will act in compensation mode for the first base station.

6. A method as defined in clause 4 or clause 5, further comprising: the first base station entering energy saving mode.

7. A method as defined in clause 3, wherein the second message indicates that the second base station will not act in compensation mode for the first base station.

8. A method as defined in clause 3, wherein the second message includes energy saving mode data for the second base station including a request that the first base station act in compensation mode for the second base station.

9. A method as defined in clause 8, further comprising: the first base station entering compensation mode and compensating for the second base station.

10. A method as defined in clause 6 when dependent on clause 4, further comprising: the first base station sending a third message to the second base station, the third message including compensation data for the first base station.

11. A method as defined in clause 6 when dependent on clause 5, further comprising: the first base station sending a third message to the third base station, the third message including compensation data for the first base station.

12. A method as defined in either clause 10 or clause 11, wherein the compensation data relates to the first base station's configuration parameters.

13. A method as defined in any one of clauses 10 to 12, wherein the compensation data relates to a fourth base station that the first base station is acting in compensation mode for.

14. A method as defined in clause 6 or any one of clauses 10 to 13, further comprising: the first base station receiving a fourth message, the fourth message instructing the first base station to exit energy saving mode; and the first base station switching from energy saving mode to normal mode.

15. A method as defined in clause 14 when dependent on clause 13, wherein the fourth message instructs the first base station to act in compensation mode for the fourth base station, the method further comprising: the first base station entering compensation mode for the fourth base station.

16. A method as defined in clause 14 or clause 15, wherein the fourth message instructs the first base station to act in compensation mode for a fifth base station, the method further comprising: the first base station entering compensation mode for the fifth base station.

17. A method as defined in clause 1, further comprising: the first base station receiving a first message from a second base station, the first message including energy saving mode data for the second base station including a request for the first base station to act in compensation mode for the second base station; and the first base station making a determination of whether to enter the compensation mode of operation based on the first message.

18. A method as defined in clause 17, wherein the first base station determines that it will compensate for the second base station, the method further comprising: the first base station sending a second message to the second base station, the second message indicating that the first base station will compensate for the second base station.

19. A method as defined in clause 18, wherein the first base station determines that it will not compensate for the second base station, the method further comprising: the first base station sending a second message to the second base station, the second message indicating that the first base station will not compensate for the second base station.

20. A method as defined in either clause 18 or clause 19, further comprising: the first base station determining that a third base station will act in compensation mode for the second base station; and the first base station sending a second message to the second base station, the second message indicating that the third base station will compensate for the second base station.

21. A method as defined in clause 19, further comprising: the first base station sending a second message to the second base station, the second message including energy saving mode data for the first base station including a request that the second base station act in compensation mode for the first base station.

22. A method as defined in clause 21, further comprising: the first base station entering energy saving mode.

23. A method as claimed in either clause 18 or clause 20, when dependent on claim 18, further comprising: the first base station receiving a third message, the third message including compensation data for the second base station.

24. A method as defined in clause 23, wherein the compensation data relates to the second base station's configuration parameters.

25. A method as defined in clause 24, wherein the compensation data relates to a fourth base station that the second base station is compensating for.

26. A method as defined in clause 25, further comprising: the first base station acting in compensation mode for the fourth base station.

27. A method as defined in either clause 18, clause 20 when dependent on clause 18, or any one of clauses 23 to 26, further comprising: the first base station sending a fourth message to the second base station, the fourth message instructing the second base station to exit energy saving mode.

28. A method as defined in clause 27 when dependent on clause 26, wherein the fourth message instructs the second base station to act in compensation mode for the fourth base station.

29. A method as defined in clause 27, wherein the fourth message instructs the second base station to act in compensation mode for a fifth base station.

30. A method as claimed in any one of the preceding clauses, wherein the energy saving mode data indicates that the first base station is of a first network operator's network.

31. A computer program comprising instructions which, when the program is executed by a computer, cause the computer to carry out the method of any one of the preceding clauses.

32. A base station comprising a transceiver, a processor and memory, wherein the processor is configured to perform the method of any one of the preceding clauses.

The invention claimed is:

1. A method of operating a base station in a cellular telecommunications network, the base station having a normal mode of operation, a compensation mode of operation and an energy saving mode of operation and being configured to switch between the normal mode of operation, the compensation mode of operation and the energy saving mode of operation, the method comprising:
   the first base station sending a first message to a second base station, the first message including energy saving mode data for the first base station, the energy saving mode data relating to the first base station requesting that the second base station act in the compensation mode of operation for the first base station;
   the first base station receiving a second message, the second message being responsive to the energy saving mode data for the first base station, and including energy saving mode data for the second base station including a request that the first base station act in the compensation mode of operation for the second base station; and
   the first base station entering the compensation mode of operation and compensating for the second base station.

2. A method of operating a base station in a cellular telecommunications network, the base station having a normal mode of operation, a compensation mode of operation and an energy saving mode of operation and being configured to switch between the normal mode of operation, the compensation mode of operation and the energy saving mode of operation, the method comprising:
   the first base station receiving a first message from a second base station, the first message including energy saving mode data for the second base station including a request that the first base station act in the compensation mode of operation for the second base station;
   the first base station sending a second message to the second base station, the second message including energy saving mode data for the first base station including a request that the second base station act in the compensation mode of operation for the first base station; and the first base station entering energy saving mode.

3. A non-transitory computer readable storage element comprising instructions which, when executed by a computer, cause the computer to carry out the method of claim 1.

4. A base station comprising a transceiver, a processor and memory, wherein the processor is configured to perform the method of claim 1.

5. A non-transitory computer readable storage element comprising instructions which, when executed by a computer, cause the computer to carry out the method of claim 2.

6. A base station comprising a transceiver, a processor and memory, wherein the processor is configured to perform the method of claim 2.

* * * * *